US011713701B2

(12) United States Patent
Feng et al.

(10) Patent No.: US 11,713,701 B2
(45) Date of Patent: Aug. 1, 2023

(54) EXHAUST GAS HEATING DEVICE, HAVING A METAL FOAM HEATING ELEMENT

(71) Applicant: FAURECIA SYSTEMES D'ECHAPPEMENT, Nanterre (FR)

(72) Inventors: Ting Feng, Vieux-Charmont (FR); Yannick Fourcaudot, Luze (FR)

(73) Assignee: FAURECIA SYSTEMES D'ECHAPPEMENT

( * ) Notice: Subject to any disclaimer, the term of this patent is extended or adjusted under 35 U.S.C. 154(b) by 284 days.

(21) Appl. No.: 16/953,483

(22) Filed: Nov. 20, 2020

(65) Prior Publication Data

US 2021/0156290 A1 May 27, 2021

(30) Foreign Application Priority Data

Nov. 22, 2019 (FR) ..................................... 19 13083

(51) Int. Cl.
*F01N 3/20* (2006.01)
*F01N 3/027* (2006.01)
*H05B 3/12* (2006.01)

(52) U.S. Cl.
CPC ........... *F01N 3/2013* (2013.01); *F01N 3/027* (2013.01); *H05B 3/12* (2013.01); *F01N 2240/16* (2013.01); *F01N 2330/22* (2013.01); *H05B 2203/017* (2013.01); *H05B 2203/022* (2013.01)

(58) Field of Classification Search
CPC .... F01N 3/027; F01N 3/2013; F01N 2240/16; F01N 2330/22; H05B 3/12; H05B 2203/017; H05B 2203/022
See application file for complete search history.

(56) References Cited

U.S. PATENT DOCUMENTS

| 5,463,206 A | 10/1995 | Abe et al. |
| 2012/0017565 A1 | 1/2012 | Gaiser |
| 2014/0209201 A1* | 7/2014 | Hodgson ................... F01N 3/01 138/108 |
| 2019/0316507 A1 | 10/2019 | Ottaviani et al. |

FOREIGN PATENT DOCUMENTS

| CN | 102560176 A | 7/2012 |
| CN | 102596409 A | 7/2012 |
| CN | 103827453 A | 5/2014 |
| JP | 04366584 A | 12/1992 |
| JP | H05144549 A | 6/1993 |
| JP | H05202734 A | 8/1993 |
| JP | 09260030 A | 10/1997 |
| JP | 2013020847 A | 1/2013 |
| WO | 9732119 A1 | 9/1997 |
| WO | WO-2014034980 A1 * | 3/2014 ........... F01N 3/0217 |

OTHER PUBLICATIONS

French Preliminary Research Report dated Jun. 3, 2020 for French Application No. 19 13083.

* cited by examiner

*Primary Examiner* — Audrey B. Walter
(74) *Attorney, Agent, or Firm* — Carlson, Gaskey & Olds, P.C.

(57) ABSTRACT

A heating device includes a heating element in the form of a metal foam, and a case defined by a side wall that extends along a longitudinal axis. The metal foam is housed in the case. An electrical thermal insulator is arranged between the metal foam and the case. The heating device includes at least one electrode and the metal foam includes a zone configured to receive the at least one electrode.

5 Claims, 5 Drawing Sheets

EXHAUST GAS HEATING DEVICE, HAVING A METAL FOAM HEATING ELEMENT

CROSS-REFERENCE TO RELATED APPLICATIONS

This application is a U.S. non-provisional application claiming the benefit of French Application No. 19 13083, filed on Nov. 22, 2019, which is incorporated herein by reference in its entirety.

TECHNICAL FIELD

The present disclosure relates to an exhaust gas heating device, intended to equip an exhaust line of a combustion engine, in particular a vehicle combustion engine.

BACKGROUND

Already known from the state of the art is a combustion engine exhaust line, comprising a catalytic purification device, intended to reduce the polluting particles (in particular the nitrogen oxides NOx) into inoffensive particles (in particular dinitrogen $N_2$ and water $H_2O$). To that end, the exhaust gas passes through a catalytic purification unit.

It should be noted that the effectiveness of the catalytic purification unit is optimal when the reaction takes place at a high temperature. Thus, during a cold start, the reaction is less effective, and more polluting particles are emitted.

In order to address this drawback, one solution consists of equipping the exhaust line with an exhaust gas heating device, intended to heat the exhaust gases before they pass through the purification unit, until the engine emits hot enough gases. This heating device is arranged upstream from the purification unit.

One known example of a heating device includes a heating element formed by a metal foam, traveled through by an electric current so as to heat it by Joule effect. The metal foam is arranged so as to be passed through by the exhaust gases, which are thus heated before entering the purification unit. The electric current is provided by an electrode electrically connected to the metal foam.

Such a heating device is not fully satisfactory, however, in particular in that the electrical connection between the electrode and the metal foam is difficult to produce.

SUMMARY

The disclosure provides a heating device whereof an electrical connection between an electrode and metal foam is done simply and reliably.

In one exemplary embodiment, an exhaust gas heating device for a heat engine exhaust line comprises:
 a heating element in the form of a metal foam,
  a case, defined by a side wall extending along a longitudinal axis, in which the metal foam is housed,
  an electrical thermal insulator arranged between the metal foam and the case,
  at least one electrode, and
  wherein the metal foam includes a zone configured to receive the at least one electrode.

Because of the zone of the metal foam molded to receive the electrode, the device does not require an additional connecting element between the electrode and the metal foam.

A heating device according to the disclosure may further include one or more of the following features, considered alone or according to all of the technically possible combinations:
 The metal foam includes a foam preform, having a homogeneous cellular structure in its entire volume.
 The heating device includes a protective layer formed by a first liquid material having impregnated the periphery of the metal foam before being dried, the electrical thermal insulator comprising at least one annular element surrounding the protective layer.
 The heating device includes two annular elements for maintaining the metal foam, arranged on either side of the metal foam in the direction of the longitudinal axis, and each secured to the case.
 At least one of the annular elements includes fastening tabs, extending toward the longitudinal axis, and the case includes, for each fastening tab, a welding orifice, through which a corresponding fastening tab is welded to the case.
 The disclosure also relates to an exhaust line of a heat engine that includes a heating device as previously defined.
 The disclosure also relates to a vehicle, in particular a motor vehicle that includes an exhaust line as defined above.

The disclosure lastly relates to a method for manufacturing the exhaust gas heating device, wherein the metal foam is manufactured according to the following steps:
 manufacturing a foam preform,
 filling the foam preform with a first liquid metal having a first density,
 drying the foam preform filled with the first liquid metal,
 first sintering of the foam preform filled with the first liquid metal,
 after the first sintering, injecting a second liquid metal having a second density higher than the first density into at least one zone of a periphery of the foam preform filled with the first liquid metal, and
 second sintering of the foam preform comprising the at least one zone.

Advantageously, in one example, the at least one zone comprises at least two injection zones, and the manufacture of the metal foam includes, after the first sintering and before the injection of the second liquid metal, the cutting of the foam preform filled with the first liquid metal and sintered into a first shape, the at least two injection zones of the second liquid metal being on the periphery of this first shape.

Optionally, the first shape has dimensions larger than those of a desired final shape, the manufacture of the metal foam comprising, after the second sintering, the cutting of the first shape in order to obtain the desired final shape.

BRIEF DESCRIPTION OF THE DRAWINGS

Various aspects and other advantages of the disclosure will the highlighted in the following description, provided solely as a non-limiting example and done in reference to the appended figures, in which.

DETAILED DESCRIPTION OF THE DRAWINGS

Figure 1:
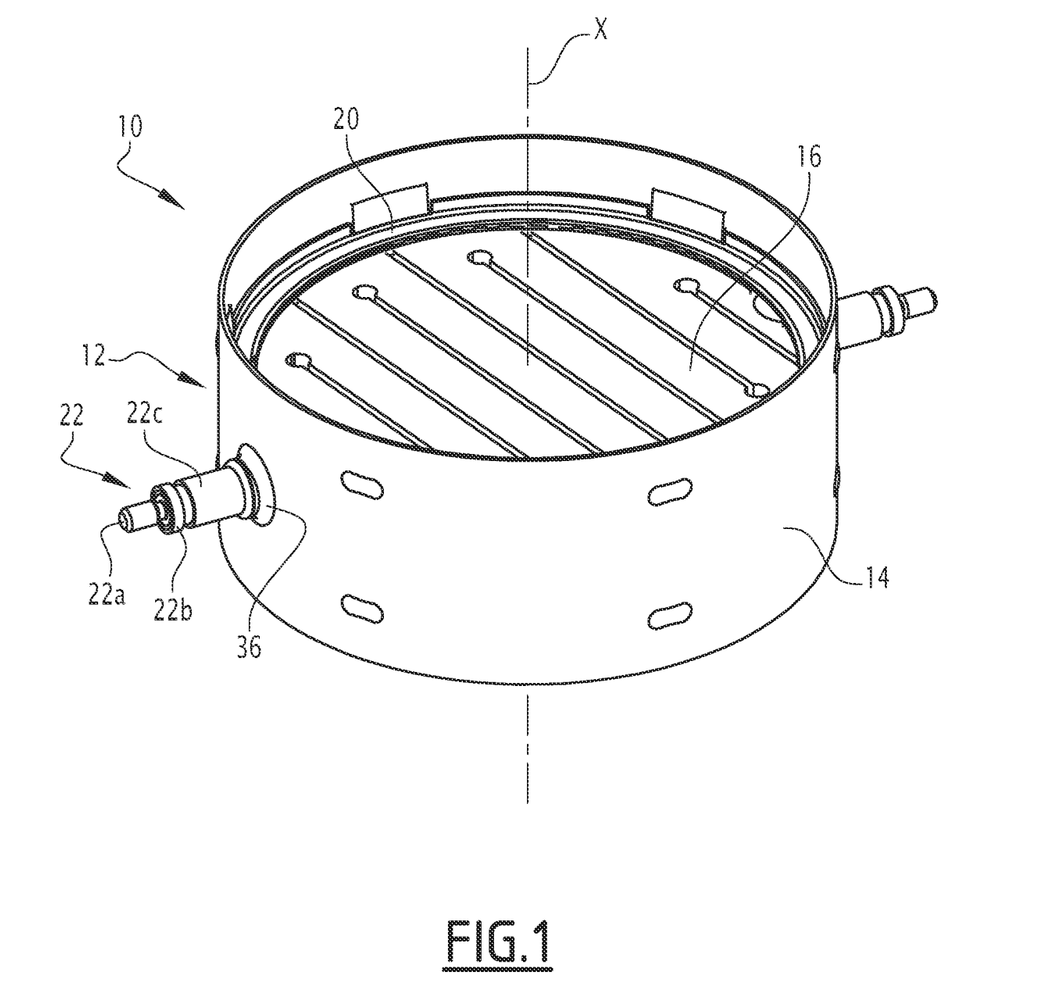
FIG. 1 is a perspective view of a heating device according to a first example of the disclosure.
Figure 2:
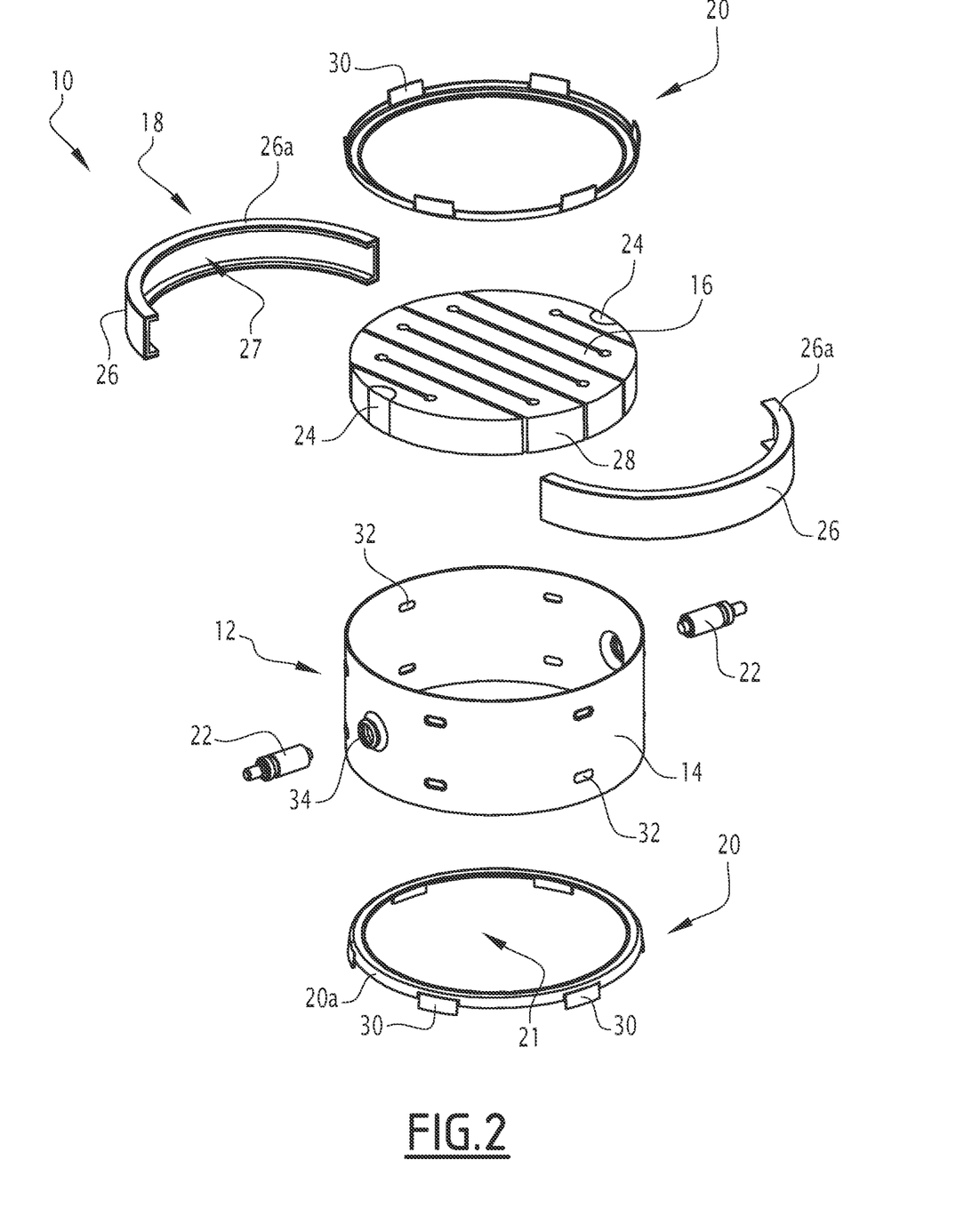
FIG. 2 is an exploded perspective view of the heating device of FIG. 1.

FIGS. 1 and 2 show a heating device 10 according to one exemplary embodiment of the disclosure.

The heating device 10 is suitable for being arranged in an exhaust line of a heat engine, upstream of an exhaust gas purification device. The heat engine is, for example, that of a vehicle, in particular a motor vehicle, but in a variant could be any other heat engine.

The purification device includes, in a manner known in itself, a catalytic purification unit, allowing the reduction of the polluting particles (in particular the nitrogen oxides NOx) into inoffensive particles (in particular dinitrogen $N_2$ and water $H_2O$). The reduction reaction being more effective at a high temperature, the heating device 10 is intended to heat the exhaust gases upstream of the purification device, in particular during a cold start of the heat engine.

The heating device 10 includes a case 12 formed by a generally cylindrical wall 14 extending along a longitudinal axis X. Preferably, the wall 14 has a cylindrical general shape with a circular, oval or rectangular base with rounded corners, defined around the longitudinal axis X.

The heating device 10 further includes a heating element 16, housed in the case 12, electrical and a thermal insulator 18 inserted radially between the heating element 16 and the wall 14 of the case 12, and maintaining elements 20. The heating device 10 also includes at least one electrode 22 electrically connected to the heating element 16, intended to pass a current in this heating element 16 in order to heat it by Joule effect. Preferably, the heating device includes two electrodes 22.

Preferably, each electrode 22 includes a conductive core 22a, surrounded by an insulating sheath 22b.

The conductive core 22a is, for example, made from metal, in particular made from a material chosen from Iron-Chromium-Aluminum (FeCrAl) and alloys thereof, Nickel-Chromium (NiCr) and alloys thereof, stainless steel, Inconel® or silicon carbide.

The insulating sheath 22b is, for example, made from Magnesium Oxide MgO or alumina $Al_2O_3$.

The insulating sheath 22b is preferably in turn surrounded by a shell 22c made from a weldable material (in particular Inconel® or NiCr), intended to be welded to the case 12. This shell 22c is electrically insulated from the conductive core 22a owing to the insulating sheath 22b.

The heating element 16 is formed by a metal foam, the manufacture of which according to the disclosure will be described later.

Preferably, the metal foam 16 is made from Iron-Chromium-Aluminum (FeCrAl) alloy or Nickel Chromium (NiCr) alloy. The metal foam 16 has a density inclusively between 8 and 11%, and a thickness (considered in the direction of the longitudinal axis X) inclusively between 15 and 30 mm.

The metal foam 16 has at least one zone 24 molded to receive one among the at least one electrode 22. The zone 24 can be arranged in any appropriate location of the metal foam 16. In the described example, the metal foam 16 includes two zones 24, arranged at the periphery of the metal foam 16, arranged opposite one another. In a variant, it would be possible to provide a zone 24 at the center of the metal foam 16, or near the center of the metal foam 16. According to another variant, the zones 24 could be arranged at the periphery of the metal foam 16, not opposite one another, but such that the electrodes 22 form an angle relative to one another, for example less than or equal to 45°, or inclusively between 120° and 180°.

Preferably, each zone 24 is a densified welding zone 24, intended to be coupled to the respective one of the electrodes 22, by welding. In other words, the density of the welding zone 24 is sufficient to allow the welding of the corresponding electrode 22.

Each zone 24 preferably extends over a depth of at least 5 mm in the metal foam 16. Furthermore, each zone 24 preferably extends over a diameter greater than twice the diameter of the conductive core 22a of the electrode 22. Thus, for a conductive core 22a having a diameter of about 6 mm, the diameter of the corresponding zone 24 is at least 12 mm, for example about 18 mm.

The thermal insulator 18 includes at least one insulating element 26, preferably two insulating elements 26, at least partially surrounding the periphery of the heating element 16. More specifically, the two insulating elements 26 are arranged to leave the densified welding zones 24 exposed.

Advantageously, the insulating elements 26 include rims 26a, together delimiting a recess 27 in which the periphery of the heating element 16 is housed. The rims 26a therefore frame the periphery of the heating element 16, on either side of this heating element 16 in the direction of the longitudinal axis X.

The insulating elements 26 in particular make it possible to ensure radial tightness with respect to the exhaust gases, to ensure that the exhaust gases only pass through the heating element 16 in the direction of the axis X.

Each insulating element 26 is, for example, formed by a web of fibers made from an electrically insulating material. Any electrically insulating material is conceivable.

Advantageously, a protective layer 28 covers the periphery of the heating element 16. The protective layer 28 is intended to protect the insulating elements 26 from the aggressive porous edges of the metal foam 16. Thus, once the protective layer 28 is applied, the heating element 16 has a smooth periphery and no longer a porous and aggressive periphery. Thus, the lifetime of the insulating elements 26 is improved.

According to one exemplary embodiment, the protective layer 28 is made from metal, for example the same metal as that forming the metal foam 16. In a variant, the protective layer 28 can, for example, be made from ceramic or magnesium oxide MgO. According to another variant, the protective layer 28 can be made from any other appropriate material, as long as it makes it possible to smooth the periphery of the heating element 16.

The maintaining elements 20 are intended to maintain the heating element 16, as well as the insulating elements 26, in the direction of the longitudinal axis X. More particularly, in the described example, the maintaining elements 20 maintain the insulating elements 26, which maintain the heating element 16. The maintaining elements 20 are preferably substantially identical.

Each maintaining element 20 has an annular general shape, having a peripheral contour 20a intended to be secured to the wall 14 of the case 12 (and more particularly on an inner face of this wall 14), and extending enough radially to extend across from a part of the heating element 16. Thus, the maintaining elements 20 grip the heating element 16, on either side of this heating element 16 in the direction of the longitudinal axis X.

Each maintaining element 20 delimits a central opening 21 allowing the passage of exhaust gases toward the heating element 16.

Each maintaining element 20 includes, on its peripheral contour 20a, a plurality of fastening tabs 30, for example between three and eight fastening tabs, preferably four or six fastening tabs 30, evenly distributed over the peripheral contour 20a. The fastening tabs 30 extend parallel to the longitudinal axis X, moving away from the heating element 16. Thus, it is possible to perform a welding operation on these heating elements 16, without the heat given off by the welding damaging the metal foam 16.

The wall 14 of the case 12 includes, for each fastening tab 30, a welding orifice 32, through which the welding of the corresponding fastening tab 30 is done with the wall 14. These welding orifices 32 make it possible to facilitate the access to the fastening tabs 30 and to reduce the welding time of these fastening tabs 30.

The welding orifices 32 preferably have an oblong general shape extending circumferentially, so as to allow an optimal welding surface, all along the contour of each welding orifice 32.

It will be noted that the metal foam 16 is thus not welded directly on the case 12, but axially maintained by the maintaining elements 20, which are in turn welded to the case 12. One thus avoids all of the difficulties related to the welding of a metal foam.

The wall 14 of the case 12 also has passage openings 34 for the electrodes 22, each passage opening 34 preferably being arranged across from the respective one of the welding zones 24 of the heating element 16. Alternatively, the passage opening 34 is offset relative to the welding zones 24. Each passage opening 34 preferably has a peripheral rim 36 extending radially toward the outside of the case 12, allowing good maintenance of the corresponding electrode 22.

The method for manufacturing the heating device 10 will now be described.

The method first includes manufacturing the metal foam.

Figure 3:
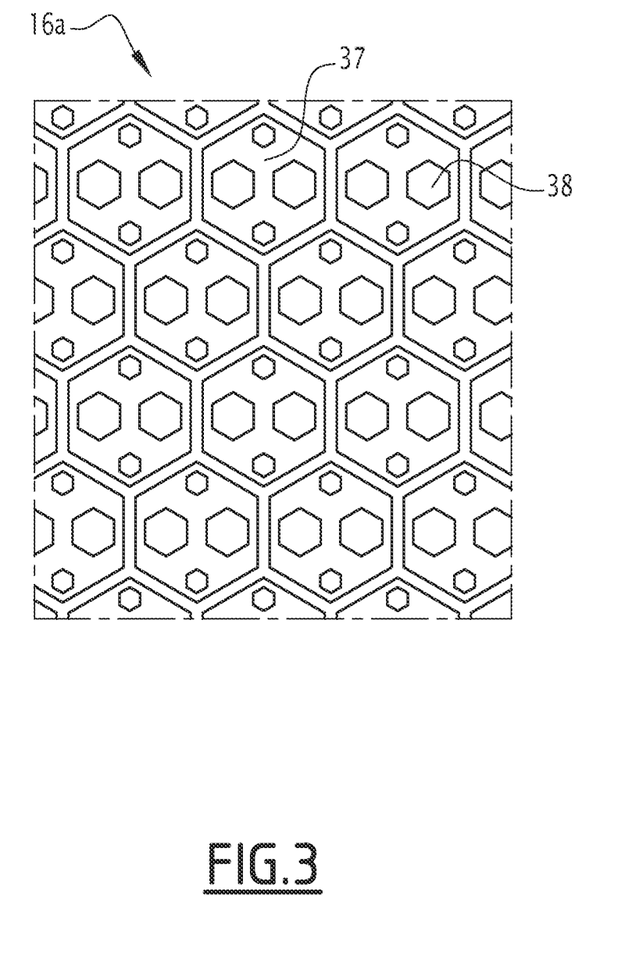
FIG. 3 is a detail in perspective view of a preform for manufacturing a metal foam of the heating device of FIG. 1.

The manufacture of the metal foam 16 includes a step for manufacturing a foam preform 16a, partially shown in FIG. 3. The foam preform 16a according to the disclosure preferably has a cellular structure that is homogeneous throughout its entire volume. As shown in FIG. 3, the cellular structure, for example, includes cells 37, with a general polyhedral shape, and more particularly hexagonal shape. The cells 37 communicate with one another by orifices 38. Advantageously, the size of the cells is inclusively between 0.4 and 5 mm.

Such a foam preform 16a is, for example, manufactured by an additive manufacturing method, in particular 3D printing. The foam preform 16a is, for example, made from polyurethane.

Due to the predefined and homogeneous structure of the foam preform 16a, it is easy to know its behavior (which is reproducible) and this behavior is similar throughout the entire foam preform 16a.

Alternatively, the foam preform 16a has a nonhomogeneous structure (preform of the classic sponge type).

It will be noted that the foam preform 16a preferably has dimensions larger than those of the final metal foam 16.

The method next includes filling the foam preform 16a with a first liquid metal, having a first density. The first liquid metal can be a molten metal, or in a variant a fluid having metal particles (metal sludge). The first density is, for example, inclusively between 4 and 15% of the density of the metal foam 16.

The foam preform 16a is thus impregnated with first liquid metal, which then covers the material forming this foam preform 16a.

The method next includes the drying of the foam preform 16a filled with metal, until the first metal is no longer liquid, and thus stays attached to the foam preform 16a.

The method next includes first sintering of the foam preform 16a filled with metal and dried. Sintering refers to heating of the foam preform filled with metal and dried, below the melting temperature of the first metal, in order to improve the cohesion of the first metal.

Preferably, the manufacture of the metal foam 16 includes cutting the foam preform 16a filled with metal and sintered into a first shape, still having dimensions greater than those of the final shape of the metal foam 16. This first shape is, for example, a rectangular parallelepiped, in particular with square base. This first shape is shown in FIG. 4, designated by reference 16b.

Figure 4:
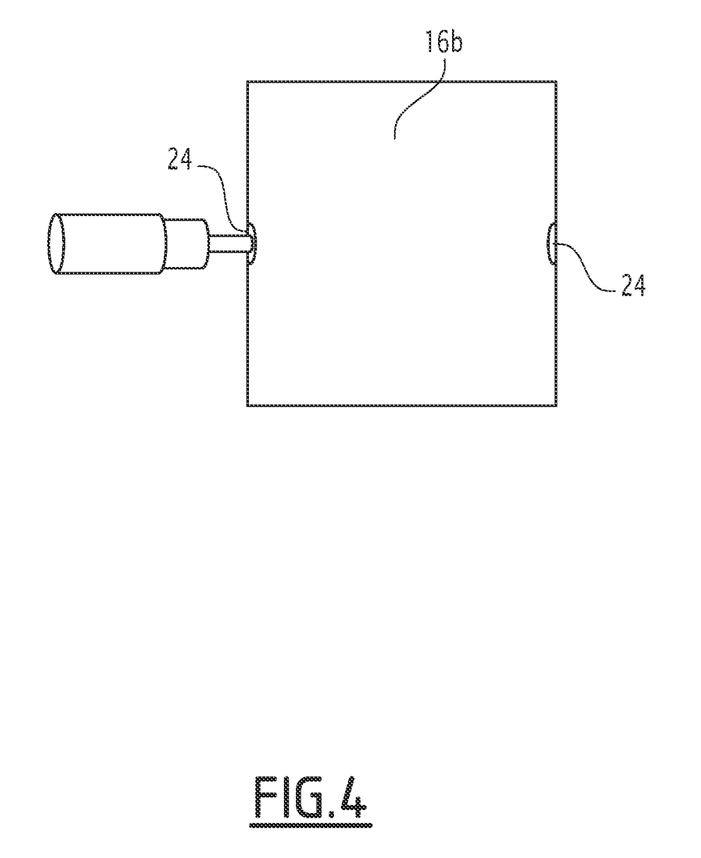
FIG. 4 schematically shows, in top view, the metal foam of the heating device of FIG. 1, during one step of its manufacture.

Advantageously, the manufacture of the metal foam 16 includes, after the first sintering, the injection of a second liquid metal having a second density greater than the first density, into two separate zones on the periphery of the first shape 16b filled with metal, sintered and cut, as shown in FIG. 4.

The second liquid metal can be a molten metal, or in a variant a fluid having metal particles (metal sludge). The second density is, for example, greater than 90% of the density of the metal foam 16.

Preferably, the second liquid metal is made from the same material as the first liquid metal, in particular FeCrAl or NiCr alloy, but with a density greater than the density of the first liquid metal.

The zones in which the second liquid metal is injected are the welding zones 24.

The method next includes a second sintering, to improve the cohesion of the welding zones 24.

Alternatively, the welding zones 24 are not formed by injection of the second liquid metal in the metal foam 16. In this case, the method includes the formation, by piercing, of at least one blind orifice in the metal foam 16, then filling of this blind orifice with the material forming the zone 24, in particular with the second liquid metal.

According to another variant, the blind orifice is not formed by piercing, but is made once the metal foam 16 is formed. More specifically, the preform 16a in this case already includes the blind orifice.

The manufacture of the metal foam 16 next comprises cutting the first shape 16b in order to obtain the desired final shape, which substantially corresponds to the shape of the case 12, in particular cylindrical, for example with a circular, oval or rectangular base with rounded corners.

It will be noted that the metal foam 16 obtained using the method according to the disclosure is recognizable, due to its homogeneous cellular structure and/or the presence of the welding zones 24.

Preferably, the manufacture of the metal foam 16 includes applying the protective layer 28 to its periphery, so as to obtain a smooth, nonaggressive periphery. As previously indicated, the protective layer 28 is, for example, made from metal, ceramic or magnesium oxide MgO. When the protective layer 28 is made from metal, it is for example made with the first liquid metal.

The application of the protective layer 28 can be done by a spraying or painting operation.

The manufacturing method next includes assembling the heating device 10.

The heating element 16 is assembled with the insulating elements 26, which are fitted on its periphery, leaving the welding zones 24 exposed.

One of the maintaining elements 20 is welded to the case 12, by welding its fastening tabs 30 through the welding orifices 32. The heating element 16 provided with the insulating elements 26 can next be inserted into the case 12, while being supported by the maintaining element 20 welded to the inside of this case 12. During this insertion, the welding zones 24 of the heating element 16 must be arranged across from the corresponding passage openings 34.

The other maintaining element 20 can be attached above the heating element 16, which is thus gripped between the two maintaining elements 20. This other maintaining element 20 is then welded to the case 12, like the preceding maintaining element 20.

The electrodes 22 are next attached, each through the corresponding passage opening 34, the conductive core 22a of each electrode 22 being welded to the corresponding welding zone 24. This is made possible owing to the sufficient density of this welding zone 24, which allows direct contact between the electrodes 22 and the metal foam 16.

The shell 22c of each electrode 22 is next welded to the rim 36 of the passage opening 34, for good maintenance of the electrode 22 on the case 12.

It will be noted that the disclosure allows good control of the structure of the metal foam, the size, the porosity density and the homogeneity of which are connected to the preform 16a. Due to its homogeneity, the cells all have substantially the same shape and the same size, the thermal constraints are substantially identical throughout the entire volume of the metal foam 16. Furthermore, the thickness of the metal foam 16, considered in the direction of the longitudinal axis X, is preferably constant. In a variant, the thickness of the metal foam 16 is not constant, and could for example have local over-thicknesses and/or under-thicknesses.

The dimensions and the behavior of the metal foam 16 being predictable and reproducible, it is easy to perform simulations and tests in order to control the mechanical and electrical resistances of this metal foam.

It will be noted that the disclosure also makes it possible to produce heating elements 16 with all shapes, in particular S- or E-shaped bases, by choosing a preform 16a with an appropriate shape.

Figure 5:
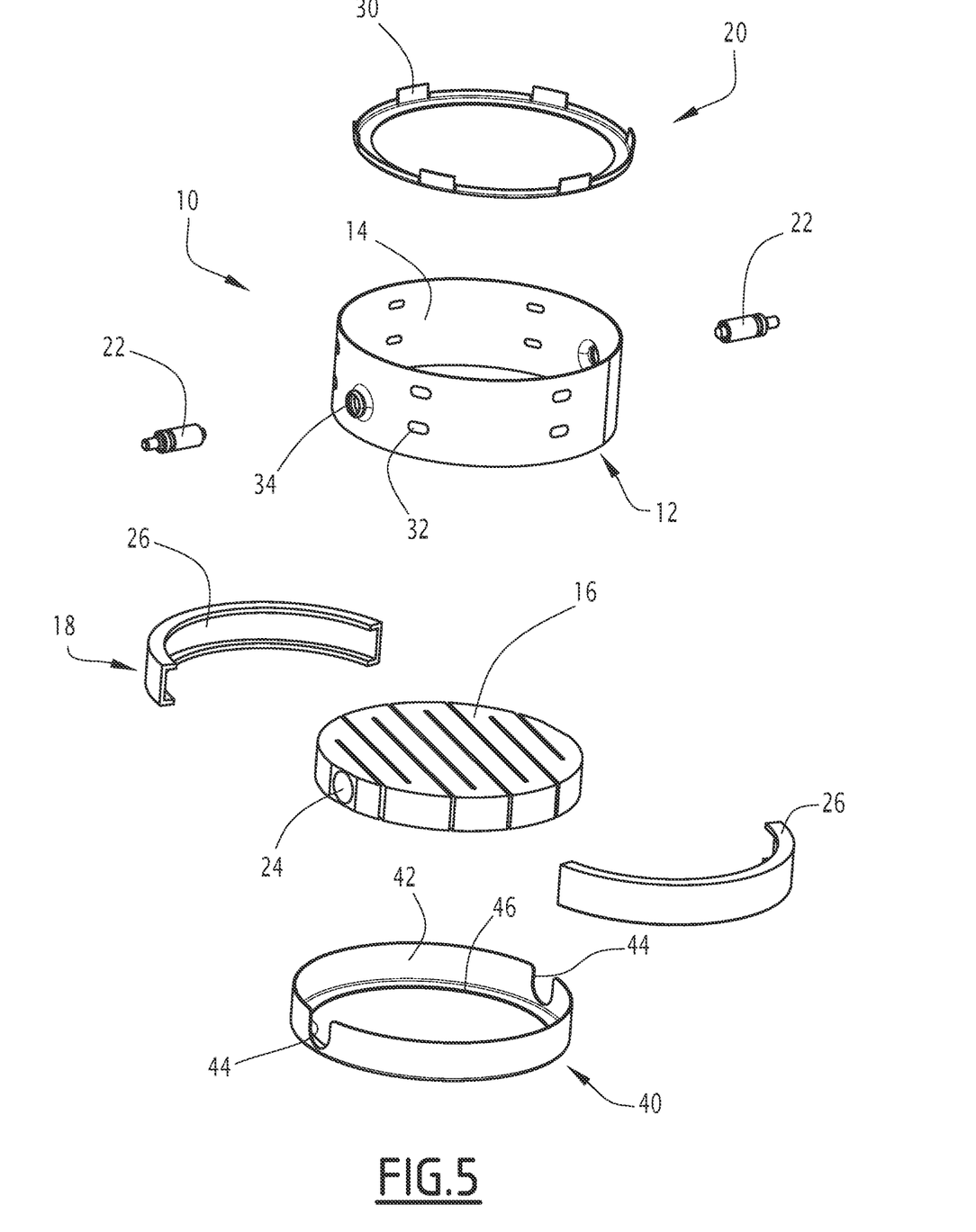
FIG. 5 is an exploded perspective view of a heating device according to a second example of the disclosure.

FIG. 5 shows a heating device 10 according to a second exemplary embodiment of the disclosure. In this figure, the elements similar to those of the two preceding figures are designated using identical references.

According to this second embodiment, the heating device 10 includes first 20 and second 40 annular maintaining elements with different shapes.

The first annular maintaining element 20 is identical to those of the first embodiment. It includes fastening tabs 30 in the same manner.

The second annular maintaining element 40, conversely, does not include fastening tabs, but includes a peripheral edge 42, including notches 44 for the passage of the electrodes 22. This peripheral edge 42 extends parallel to the longitudinal direction.

It is this peripheral edge 42 that is welded to the case 12, through the welding orifices 32 across from this peripheral edge 42.

It will be noted that this peripheral edge 42 is preferably oriented so as to surround the heating element 16.

The second annular maintaining element 40 also includes an annular part 46 extending enough radially to extend across from a part of the heating element 16. Thus, the maintaining elements 20, 40 grip the heating element 16, on either side of this heating element 16 in the direction of the longitudinal axis X.

This second embodiment has the advantage of making it possible to reduce the height of the case 12 in the direction of the longitudinal axis X, in particular because the peripheral edge 42 surrounds the heating element 16. Thus, this height of the case 12 is, for example 51 mm, whereas it is for example 65 mm in the first embodiment, which implies a height reduction of 14 mm in the described example.

Furthermore, the distance, in the direction of the longitudinal axis X, between the two circumferential rows of welding orifices 32, is also reduced relative to the first embodiment.

In general, the second embodiment allows a more compact version of the heating device 10.

The disclosure is not limited to the embodiments described above, and could assume various complementary variants.

The invention claimed is:

1. An exhaust gas heating device for a heat engine exhaust line, comprising:
   a metal foam forming a heating element;
   a case, defined by a side wall extending along a longitudinal axis, in which the metal foam is housed;
   two annular elements for maintaining the metal foam, arranged on either side of the metal foam in a direction of the longitudinal axis, and each secured to the case;
   an electrical thermal insulator arranged between the metal foam and the case;
   at least one electrode;
   wherein the metal foam includes a zone configured to receive the at least one electrode; and
   wherein at least one of the two annular elements includes fastening tabs, extending toward the longitudinal axis, and the case includes, for each fastening tab, a welding orifice, through which a corresponding fastening tab is welded to the case.

2. The exhaust gas heating device according to claim 1, wherein the metal foam includes a foam preform, having a homogeneous cellular structure in its entire volume.

3. The exhaust gas heating device according to claim 1, including a protective layer formed by a first liquid material having impregnated a periphery of the metal foam before being dried, the electrical thermal insulator comprising at least one annular element surrounding the protective layer.

4. A heat engine exhaust line comprising:
   an exhaust gas heating device comprising
      a metal foam forming a heating element,
      a case, defined by a side wall extending along a longitudinal axis, in which the metal foam is housed,
      two annular elements for maintaining the metal foam, arranged on either side of the metal foam in a direction of the longitudinal axis, and each secured to the case,
      an electrical thermal insulator arranged between the metal foam and the case,
      at least one electrode,
      wherein the metal foam includes a zone configured to receive the at least one electrode, and
      wherein at least one of the two annular elements includes fastening tabs, extending toward the longitudinal axis, and the case includes, for each fastening tab, a welding orifice, through which a corresponding fastening tab is welded to the case.

5. A vehicle, in particular a motor vehicle, comprising:
a heat engine exhaust line including an exhaust gas heating device comprising
   a metal foam forming a heating element,
   a case, defined by a side wall extending along a longitudinal axis, in which the metal foam is housed,
   two annular elements for maintaining the metal foam, arranged on either side of the metal foam in a direction of the longitudinal axis, and each secured to the case,
   an electrical thermal insulator arranged between the metal foam and the case,
   at least one electrode,
   wherein the metal foam includes a zone configured to receive the at least one electrode, and
   wherein at least one of the two annular elements includes fastening tabs, extending toward the longitudinal axis, and the case includes, for each fastening tab, a welding orifice, through which a corresponding fastening tab is welded to the case.

* * * * *